(12) United States Patent
Zielinski et al.

(10) Patent No.: US 7,591,703 B2
(45) Date of Patent: Sep. 22, 2009

(54) INTERACTIVE DVD GAMING SYSTEMS

(75) Inventors: James Zielinski, Hawthorne, CA (US); Catherine Demas, Rancho Palos Verdes, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 11/761,323

(22) Filed: Jun. 11, 2007

(65) Prior Publication Data

US 2008/0032790 A1   Feb. 7, 2008

Related U.S. Application Data

(60) Provisional application No. 60/812,153, filed on Jun. 9, 2006.

(51) Int. Cl.
  *A63H 3/00* (2006.01)
  *A63F 9/24* (2006.01)
(52) U.S. Cl. .......................... 446/268; 463/31
(58) Field of Classification Search ........................ None
    See application file for complete search history.

(56) References Cited

U.S. PATENT DOCUMENTS

| | | | |
|---|---|---|---|
| 4,307,533 A * | 12/1981 | Sims et al. ................. 446/94 |
| 4,348,191 A | 9/1982 | Lipsitz et al. |
| 4,398,720 A | 8/1983 | Jones et al. |
| 4,403,777 A | 9/1983 | Del Principe et al. |
| 4,475,132 A | 10/1984 | Rodesch |
| 4,545,582 A | 10/1985 | Andrews |
| 4,571,206 A | 2/1986 | Mayer et al. |
| 4,575,349 A * | 3/1986 | Piazza et al. ................. 446/330 |
| 4,610,639 A * | 9/1986 | Piazza ....................... 446/327 |
| 4,695,953 A | 9/1987 | Blair et al. |
| 4,703,359 A | 10/1987 | Rumbolt et al. |

(Continued)

FOREIGN PATENT DOCUMENTS

BE    1015009    8/2004

(Continued)

OTHER PUBLICATIONS

"Wii Remote," *Wikipedia*, 11 pgs., Wii remote purportedly announced on Sep. 17, 2005 at a Tokyo Game Show.

(Continued)

*Primary Examiner*—Ronald Laneau
*Assistant Examiner*—Tramar Harper
(74) *Attorney, Agent, or Firm*—Kolisch Hartwell, PC

(57) ABSTRACT

A toy figure configured to selectively control a DVD player having a DVD game medium, the DVD player having a plurality of different functions and being adapted to receive a plurality of different control signals with each control signal being associated with a different function of the DVD player, and to perform the associated function in response to a received control signal is disclosed. In some embodiments, the toy figure may include a body; at least a first orientation sensor supported by the body and configured to detect a first orientation of the body relative to a reference plane, and to generate a first orientation signal based on the detected first orientation; and a processing subsystem configured to receive at least the first orientation signal, and to generate a corresponding first one of the plurality of control signals based, at least in part, on the received first orientation signal.

12 Claims, 5 Drawing Sheets

U.S. PATENT DOCUMENTS

| | | | |
|---|---|---|---|
| 4,807,031 A | 2/1989 | Broughton et al. | |
| 4,856,081 A | 8/1989 | Smith | |
| 4,867,729 A * | 9/1989 | Weinman et al. | 446/330 |
| 4,959,810 A | 9/1990 | Darbee et al. | |
| RE33,662 E | 8/1991 | Blair et al. | |
| 5,076,584 A | 12/1991 | Openiano | |
| 5,139,261 A | 8/1992 | Openiano | |
| 5,146,215 A | 9/1992 | Drori | |
| 5,213,337 A | 5/1993 | Sherman | |
| 5,228,077 A | 7/1993 | Darbee | |
| 5,239,540 A | 8/1993 | Rovira et al. | |
| 5,255,313 A | 10/1993 | Darbee | |
| 5,414,426 A | 5/1995 | O'Donnell et al. | |
| 5,414,761 A | 5/1995 | Darbee | |
| 5,442,340 A | 8/1995 | Dykema | |
| 5,477,262 A | 12/1995 | Banker et al. | |
| 5,479,155 A | 12/1995 | Zeinstra et al. | |
| 5,552,917 A | 9/1996 | Darbee et al. | |
| 5,564,101 A | 10/1996 | Eisfeld et al. | |
| 5,583,485 A | 12/1996 | Van Lente et al. | |
| 5,588,895 A | 12/1996 | Larson | |
| 5,597,307 A | 1/1997 | Redford et al. | |
| 5,605,505 A | 2/1997 | Han | |
| 5,607,356 A | 3/1997 | Schwartz | |
| 5,614,885 A | 3/1997 | Van Lente et al. | |
| 5,614,891 A | 3/1997 | Zeinstra et al. | |
| 5,646,701 A | 7/1997 | Duckworth et al. | |
| 5,650,774 A | 7/1997 | Drori | |
| 5,686,903 A | 11/1997 | Duckworth et al. | |
| 5,689,353 A | 11/1997 | Darbee et al. | |
| 5,699,044 A | 12/1997 | Van Lente et al. | |
| 5,706,507 A | 1/1998 | Schloss | |
| 5,708,415 A | 1/1998 | Van Lente et al. | |
| 5,711,672 A | 1/1998 | Redford et al. | |
| 5,727,159 A | 3/1998 | Kikinis | |
| 5,740,425 A | 4/1998 | Povilus | |
| 5,741,182 A | 4/1998 | Lipps et al. | |
| 5,751,273 A | 5/1998 | Cohen | |
| 5,766,077 A * | 6/1998 | Hongo | 463/30 |
| 5,790,948 A | 8/1998 | Eisfeld et al. | |
| RE35,952 E | 11/1998 | Beery | |
| 5,832,472 A | 11/1998 | Sheppard, II | |
| 5,833,549 A | 11/1998 | Zur et al. | |
| 5,853,327 A * | 12/1998 | Gilboa | 463/39 |
| 5,911,582 A | 6/1999 | Redford et al. | |
| 5,954,515 A | 9/1999 | Iggulden | |
| 5,957,697 A | 9/1999 | Iggulden et al. | |
| 5,964,638 A * | 10/1999 | Emerson | 446/339 |
| 6,014,092 A | 1/2000 | Darbee et al. | |
| 6,025,830 A | 2/2000 | Cohen | |
| 6,030,290 A | 2/2000 | Powell | |
| 6,034,680 A | 3/2000 | Kessenich et al. | |
| 6,055,244 A | 4/2000 | Wall, Jr. et al. | |
| 6,076,109 A | 6/2000 | Kikinis | |
| 6,076,734 A | 6/2000 | Dougherty et al. | |
| 6,154,544 A | 11/2000 | Farris et al. | |
| 6,159,101 A | 12/2000 | Simpson | |
| 6,162,123 A | 12/2000 | Woolston | |
| 6,164,541 A | 12/2000 | Dougherty et al. | |
| 6,238,289 B1 | 5/2001 | Sobota et al. | |
| 6,256,638 B1 | 7/2001 | Dougherty et al. | |
| 6,269,238 B1 | 7/2001 | Iggulden | |
| 6,319,010 B1 | 11/2001 | Kikinis | |
| 6,327,459 B2 | 12/2001 | Redford et al. | |
| 6,330,426 B2 | 12/2001 | Brown et al. | |
| 6,408,331 B1 | 6/2002 | Rhoads | |
| 6,439,459 B1 | 8/2002 | Dougherty et al. | |
| 6,450,855 B1 | 9/2002 | Tang | |
| 6,518,950 B1 | 2/2003 | Dougherty et al. | |
| 6,540,141 B1 | 4/2003 | Dougherty et al. | |
| 6,544,124 B2 | 4/2003 | Ireland et al. | |
| 6,549,750 B1 | 4/2003 | Iggulden | |
| 6,553,410 B2 | 4/2003 | Kikinis | |
| 6,558,225 B1 | 5/2003 | Rehkemper et al. | |
| 6,565,441 B1 | 5/2003 | Hames et al. | |
| 6,587,067 B2 | 7/2003 | Darbee et al. | |
| 6,587,859 B2 | 7/2003 | Dougherty et al. | |
| 6,597,342 B1 * | 7/2003 | Haruta | 345/157 |
| 6,647,130 B2 | 11/2003 | Rhoads | |
| 6,692,358 B2 | 2/2004 | Lawrence et al. | |
| 6,712,702 B2 | 3/2004 | Goldberg et al. | |
| 6,742,188 B1 | 5/2004 | Del Castillo | |
| 6,750,978 B1 | 6/2004 | Marggraff et al. | |
| 6,761,635 B2 | 7/2004 | Hoshino et al. | |
| 6,761,637 B2 | 7/2004 | Weston et al. | |
| 6,773,349 B2 | 8/2004 | Hussaini et al. | |
| 6,902,482 B1 | 6/2005 | Woolston | |
| 6,962,518 B2 | 11/2005 | Wang | |
| 6,968,151 B2 | 11/2005 | Redford et al. | |
| 6,996,364 B2 | 2/2006 | Israel | |
| 7,003,598 B2 | 2/2006 | Kavanagh | |
| RE39,059 E | 4/2006 | Foster | |
| 2001/0016310 A1 | 8/2001 | Brown et al. | |
| 2002/0072411 A1 | 6/2002 | Matsuura et al. | |
| 2002/0081559 A1 | 6/2002 | Brown et al. | |
| 2002/0142838 A1 | 10/2002 | Russell | |
| 2003/0045352 A1 | 3/2003 | Ireland et al. | |
| 2004/0013434 A1 | 1/2004 | Hua | |
| 2004/0048642 A1 | 3/2004 | Kinzer et al. | |
| 2004/0048666 A1 | 3/2004 | Bagley et al. | |
| 2004/0054826 A1 | 3/2004 | Kavanagh | |
| 2004/0140997 A1 | 7/2004 | Gravina et al. | |
| 2004/0140998 A1 | 7/2004 | Gravina et al. | |
| 2004/0152515 A1 | 8/2004 | Wegmuller et al. | |
| 2004/0164975 A1 | 8/2004 | Ho et al. | |
| 2004/0175095 A1 | 9/2004 | Freeman | |
| 2004/0204240 A1 | 10/2004 | Barney | |
| 2004/0219500 A1 | 11/2004 | Brown et al. | |
| 2004/0219501 A1 | 11/2004 | Small et al. | |
| 2005/0026699 A1 | 2/2005 | Kinzer et al. | |
| 2005/0039210 A1 | 2/2005 | Dusenberry et al. | |
| 2005/0054407 A1 | 3/2005 | Kinzer et al. | |
| 2005/0082359 A1 | 4/2005 | Marggraff et al. | |
| 2005/0085298 A1 | 4/2005 | Woolston | |
| 2005/0143173 A1 | 6/2005 | Barney et al. | |
| 2005/0170747 A1 | 8/2005 | Wang | |
| 2005/0191936 A1 | 9/2005 | Marine et al. | |
| 2005/0215324 A1 | 9/2005 | Lippincott | |
| 2005/0245314 A1 | 11/2005 | Pirich et al. | |
| 2005/0246458 A1 | 11/2005 | Kavanagh | |
| 2005/0272493 A1 | 12/2005 | Bermudez et al. | |
| 2005/0289459 A1 | 12/2005 | Walton | |
| 2006/0135231 A1 | 6/2006 | Willis et al. | |
| 2006/0154726 A1 | 7/2006 | Weston et al. | |
| 2006/0164932 A1 | 7/2006 | Kavanagh et al. | |
| 2006/0251407 A1 * | 11/2006 | Thordarson et al. | 386/126 |
| 2007/0087803 A1 | 4/2007 | Kinzer et al. | |

FOREIGN PATENT DOCUMENTS

| | | |
|---|---|---|
| CN | 1160655 | 8/2004 |
| EP | 0738078 | 10/1996 |
| EP | 0940966 | 9/1999 |
| EP | 1126451 | 8/2001 |
| EP | 1400267 | 3/2004 |
| FR | 2821964 | 9/2002 |
| GB | 995162 | 6/1965 |
| GB | 1151351 | 5/1969 |
| GB | 2103943 | 3/1983 |
| GB | 2178667 | 2/1987 |
| GB | 2237514 | 5/1991 |
| GB | 2271724 | 4/1994 |
| GB | 2277882 | 11/1994 |
| JP | 5868272 | 4/1983 |

| | | |
|---|---|---|
| JP | 58109922 | 6/1983 |
| JP | 59121426 | 7/1984 |
| JP | 61153723 | 7/1986 |
| JP | 1159720 | 6/1989 |
| JP | 2000-061133 | 2/2000 |
| JP | 2000-225270 | 8/2000 |
| JP | 2000-225271 | 8/2000 |
| JP | 2002-108872 | 4/2002 |
| JP | 2003-210836 | 7/2003 |
| WO | WO87/05415 | 9/1987 |
| WO | WO97/04592 | 2/1997 |
| WO | WO98/41963 | 9/1998 |
| WO | WO98/49611 | 11/1998 |
| WO | WO99/09496 | 2/1999 |
| WO | WO00/30862 | 6/2000 |
| WO | WO2004/010389 | 1/2004 |
| WO | WO2004/054671 | 7/2004 |
| WO | WO2004/081765 | 9/2004 |
| WO | WO2004/087271 | 10/2004 |
| WO | WO 2004094016 A2 * | 11/2004 |
| WO | WO2005/086133 | 9/2005 |
| WO | WO2006/039339 | 4/2006 |

OTHER PUBLICATIONS

International Search Report, Aug. 25, 2008, 3 pages, U.S. Patent and Trademark Office.

Written Opinion, Aug. 25, 2008, 5 pages, U.S. Patent and Trademark Office.

* cited by examiner

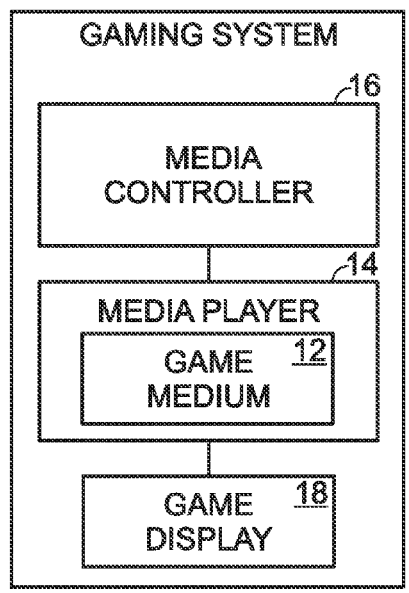
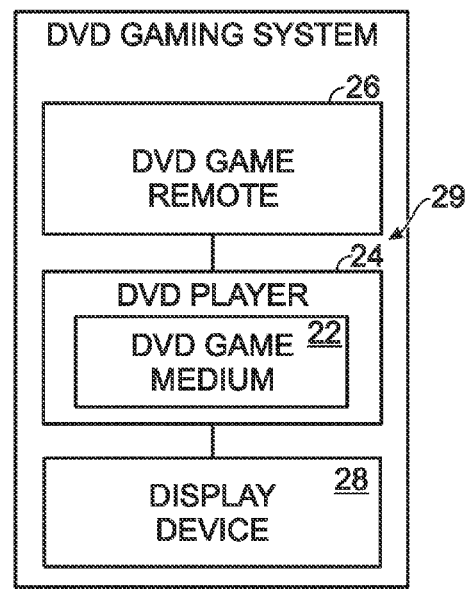
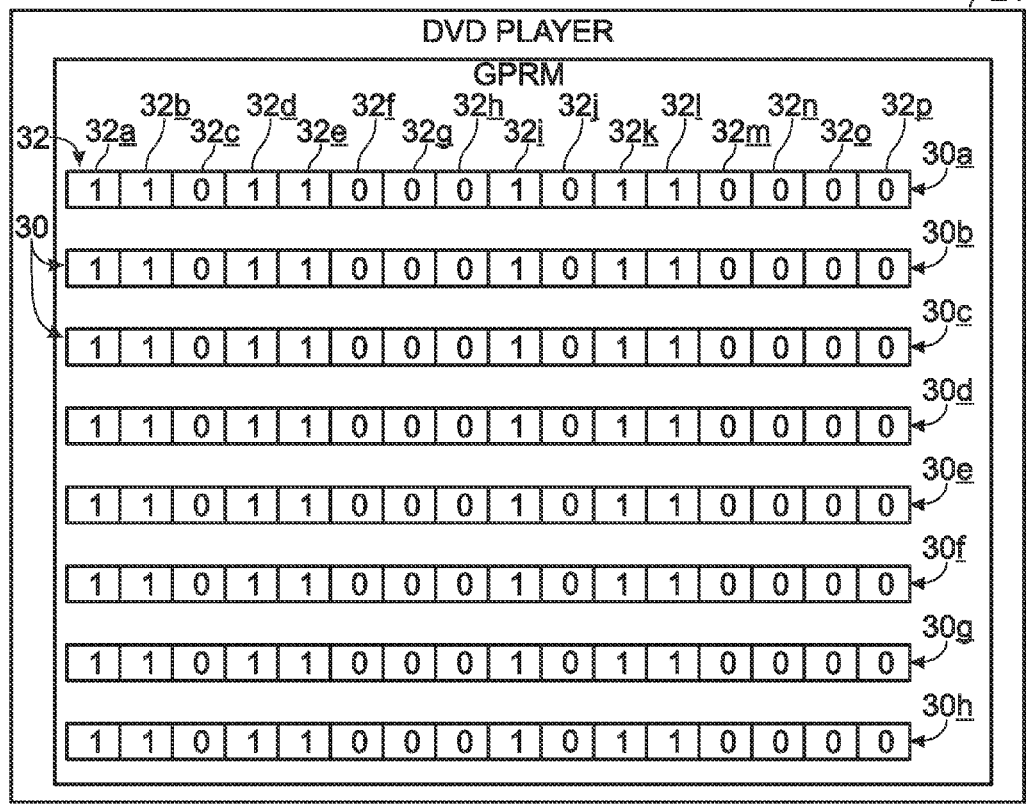

INTERACTIVE DVD GAMING SYSTEMS

CROSS-REFERENCE TO RELATED APPLICATIONS

This application claims priority under 35 U.S.C. § 119(e) to U.S. Provisional Patent Application Ser. No. 60/812,153 entitled "Ornamental Remote Control Device," filed Jun. 9, 2006. The complete disclosure of the above application is herein incorporated by reference for all purposes.

BACKGROUND OF THE DISCLOSURE

The present disclosure is directed to gaming systems that include Digital Versatile Disc (DVD) players, particularly those systems that also include DVD remotes. Examples of gaming systems, DVD players, and/or remotes are found in U.S. Pat. Nos. 4,403,777; 4,475,132; 4,571,206; 4,695,953; 4,856,081; 4,867,729; 4,959,810; 5,076,584; 5,139,261; 5,588,895; 5,605,505; 5,607,356; 5,727,159; 5,741,182; 5,751,273; 5,833,549; 5,853,327; 6,025,830; 6,030,290; 6,076,109; 6,159,101; 6,162,12; 6,238,289; 6,319,010; 6,450,855; 6,565,441; 6,544,124; 6,553,410; 6,558,225; 6,692,358; 6,742,188; 6,761,635; 6,902,482; 6,962,518; and RE33,662; U.S. Patent Application Publication Nos. 2002/0072411; 2002/0142838; 2003/0045352; 2004/0013434; 2004/0048642; 2004/0048666; 2004/0152515; 2004/0204240; 2005/0026699; 2005/0039210; 2005/0054407; 2005/0085298; 2005/0143173; 2005/0170747; 2005/0191936; 2005/0245314; 2006/0135231; 2006/0154726; and 2007/0087803; UK Patent Application Publication No. GB 2,277,882; Japanese Patent Application Publication Nos. 2000-061133; 2000-225270; 2000-225271; and 2003-210836; and PCT Patent Application Publication No. WO 2004/054671. The complete disclosures of the above patents and patent applications are herein incorporated by reference for all purposes.

SUMMARY OF THE DISCLOSURE

Some embodiments provide a toy figure configured to selectively control a DVD player having a DVD game medium, the DVD player having a plurality of different functions and being adapted to receive a plurality of different control signals with each control signal being associated with a different function of the DVD player, and to perform the associated function in response to a received control signal. In some embodiments, the toy figure may include a body; at least a first orientation sensor supported by the body and configured to detect a first orientation of the body relative to a reference plane, and to generate a first orientation signal based on the detected first orientation; and a processing subsystem supported by the body and configured to receive at least the first orientation signal, and to generate a corresponding first one of the plurality of control signals based, at least in part, on the received first orientation signal.

Some embodiments provide a DVD gaming kit for playing a game using a display device and a DVD player that is configured to receive control signals and to play a DVD game medium to produce an image on the display device that moves in a first direction in response to a first control signal. In some embodiments, the DVD gaming kit may include a DVD game medium for playing a game having a displayed image corresponding to a game character; and a toy figure having an appearance corresponding to the game character. In some embodiments, the toy figure may include a body; at least a first orientation sensor supported by the body and configured to detect a first orientation of the body relative to a reference plane, and to generate a first orientation signal based on the detected first orientation; and a processing subsystem supported by the body and configured to receive at least the first orientation signal and to generate the first control signal based, at least in part, on the received first orientation signal.

Some embodiments provide a toy figure configured to selectively control a DVD player having a DVD game medium. In some embodiments, the toy figure may include a body; a head movably connected to the body; one or more appendages connected to the body; a wing assembly attached to the body, the wing assembly including at least a pair of wings and a wing movement mechanism configured to selectively move the at least a pair of wings; at least a first orientation sensor supported by the body and configured to detect a first orientation of the body relative to a reference plane, and to generate a first orientation signal based on the detected first orientation; and a processing subsystem supported by the body and configured to receive at least the first orientation signal, and to generate a first control signal based, at least in part, on the received first orientation signal, wherein the first control signal is configured to command the DVD player to perform a first function.

BRIEF DESCRIPTION OF THE DRAWINGS

FIG. 1 is a block diagram of a gaming system.

FIG. 2 is a block diagram of a DVD gaming system.

FIG. 3 is a block diagram of a DVD player of the DVD gaming system of FIG. 2, showing eight general parameter register memories (GPRMs), each GPRM having sixteen bits.

DETAILED DESCRIPTION OF THE DISCLOSURE

Figure 4:
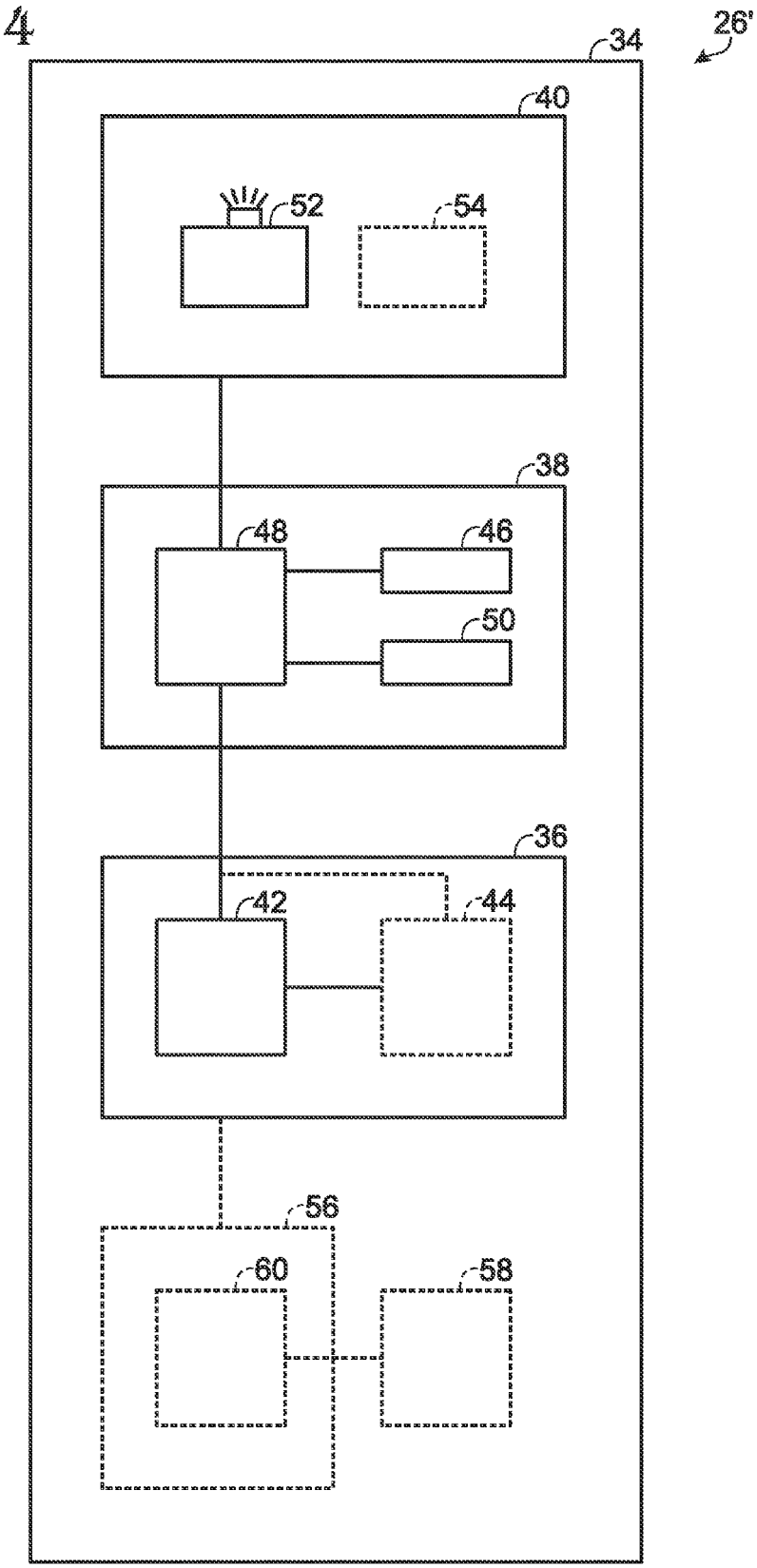
FIG. 4 is a block diagram of a DVD game remote of the DVD gaming system of FIG. 2.

Digital Versatile Discs, or DVDs, are optically-readable media capable of storing relatively large quantities of digital information, which may be subsequently accessed by a complementarily configured DVD player, such as a conventional DVD player, a personal computer DVD player, etc.

Most DVD media are 4.7-inch discs with a 0.05-inch thickness. DVD media store data on spiral tracks, which are read from the media with an extremely fine, precisely aimed laser. Data takes the form of millions of indentations, or "data pits," arranged along the spiral tracks of the media. The data pits refract light, which reduces the intensity of reflected light. Sensors register the difference in reflection intensity as binary data.

DVD media generally have a greater storage density and increased stability when compared to many other storage media, such as magnetic storage media or other optical storage media, such as compact discs (CDs). For example, DVD media are capable of storing more tracks per disc than a CD because the tracks may be placed closer together on DVDs than on CDs. The distance between tracks, or "track pitch," is approximately 0.74-microns, which is less than half that of a CD (1.6-microns). Also, the data pits on a DVD are considerably smaller than on a CD. Accordingly, the average DVD media holds four times the number of data pits that can be held by a CD. The average capacity of a single-sided, single-layered DVD is 4.7-gigabytes (GB).

Some DVD media utilize techniques such as layering and two-sided manufacturing to achieve even larger storage capacities. With layering, DVD media may be constructed with two layers, the outer layer of which is semi-transparent to allow reading of an underlying layer. The reading laser may operate at a relatively high intensity to read the inner layer, and a relatively low intensity to read the outer layer. A single-sided, double-layered DVD has a storage capacity of approximately 8.5-GB. To increase storage capacity to approximately 17-GB, both sides of a disc can be used to store digital information.

Also, the efficiency of the data structure on a DVD is generally much better than that of a CD. When CDs were first developed, considerable error correction was necessary to ensure that a CD would play correctly. Therefore, more bits were used for error detection and correction, which limited the capacity of a CD to carry usable digital information. The more efficient error correction code used with a DVD allows increased capacity for usable digital information.

Data on DVD media may be stored in a variety of formats. For example, computer applications, files, and other data may be stored using the DVD-ROM format. High quality audio may be stored using the DVD-A format. Full-length feature films are commonly stored on DVD media using the DVD-Video Standard, which utilizes MPEG-2 video compression and decompression.

DVD-Video discs are typically formatted to include up to 99 titles, which may each be subdivided into 99 chapters. Therefore, there are generally about 9,800 total chapters available on each disc. Each chapter may contain a "scene" comprised of audio or video information, or some combination thereof, which linearly plays from beginning to end. A particular chapter may, however, not be dynamically altered. In other words, the content of each chapter does not change from one viewing to the next. Each chapter may additionally, or alternatively, contain information, such as scripts and stories used herein to refer to instructions readable and executable by a conventional DVD player.

Typical game media includes code executed by a game processor to establish a game engine. That game engine generates a "scene" based on input received from a user or based on random calculations performed by the game processor, and/or dynamically alters such a scene in real-time. A DVD-Video disc, in contrast, may be practically limited to showing no more than about 9,800 pre-recorded scenes. Such scenes may, however, be played in any order or in any combination.

Also, typical gaming consoles, such as pay-to-play arcade games, personal computers, and hand-held gaming devices, are equipped with large amounts of random access memory (RAM) to hold game information. Conventional DVD players, in contrast, are not equipped with RAM specifically configured for gaming purposes. In general, conventional DVD players are designed for the sole purpose of playing high quality audio and video content. Therefore, in order to keep costs low, conventional DVD players are typically equipped with the minimum amount of resources to play encode audio and video content. Thus, because large amounts of RAM are not needed for this purpose, conventional DVD players do not include large amounts of RAM.

Furthermore, the above-mentioned gaming systems are usually capable of receiving a series of real-time commands in rapid succession from a game controller, such as a joystick or a tethered control pad. In contrast, because the only required input are playback control commands such as "Play," "Pause," "Stop," "Fast Forward," "Rewind," "Menu," "Enter," etc., which typically are not executed immediately one after the other, conventional DVD players typically include infrared input that is not configured to receive a series of real-time commands in rapid succession.

Conventional DVD players, however, typically include a minimal amount of onboard memory to enable the menu features of some DVDs, and to facilitate playing one of several possible alternate audio tracks, using one of several possible camera angles, displaying one of several possible subtitles, etc. Accordingly, some embodiments of the DVD gaming system of this disclosure include DVD media having scripts recorded thereon that are readable by a conventional DVD player. Those scripts allow the DVD media to use the available memory of the DVD player to define game variables, which in turn may be used to control game flow. In these and other embodiments, such variables may be used by scripts on the DVD to implement a series of logical decisions based on the held values of the one or more game variables, on user-provided input, or some combination thereof. These decisions may include performing actions, such as implementing other scripts, setting or modifying values of game variables, playing a specific scene or combination of scenes, or any combination thereof, to enable game play. As an example, some game variables may be used to track or change scores for one or more players of the game, and/or may be used to start, stop, and/or display a timer of the game.

FIG. 1 shows a block diagram of a gaming system 10. The gaming system may include at least one game medium 12, a media player 14, a media controller 16, and a game display 18. Game medium 12 may include stored information that may be utilized by media player 14 to present a game on game display 18. Media controller 16 may serve as an interface between a user and the gaming system, so that the user may interactively control the game. Gaming system 10 may be configured in various embodiments. For example, game medium 12 may take the form of a DVD or another suitable storage medium. Similarly, media player 14 may take the form of a conventional DVD player if the gaming system utilizes DVD game media, or, if another type of game medium is used, a media player that may be complementarily configured to play that type of medium. Media controller 16 may be an external input source, such as a general purpose controller configured to control a number of different games, or a game-specific controller particularly configured for use with a particular game. The particular embodiments of gaming system 10 that are described below should not be considered as limiting, but rather as providing illustrative examples of the numerous possible configurations and features that are within the scope of this disclosure.

FIG. 2 shows some embodiments of game system 10, in the form of a DVD gaming system 20. DVD gaming system 20 may include at least one DVD game medium 22, a DVD player 24, a DVD game remote 26, and a display device 28 (such as a television). DVD gaming system 20 may be configured to play games on DVD player 24. DVD game remote 26 may include one or more components configured to selectively control DVD player 24, such as to facilitate game play on the DVD player. In some embodiments, the DVD game remote and the DVD game medium may be referred to as a DVD gaming kit 29 that may be used to play one or more games using DVD player 24 and display device 28.

The digital information stored on DVD game medium 22 may be formatted and arranged to utilize the minimal memory of DVD players, such as DVD player 24. DVD game medium 22 may store information corresponding to one or more games, and different DVD game media may store information corresponding to other games. Various DVD game media may be used to play different games on DVD player 24. In contrast to standard gaming consoles that require proprietary players to play proprietary and/or standard media, DVD player 24 may not need to be specially configured to play games stored on DVD game medium 22. Instead, DVD game medium 22 may include information instructing DVD player 24 to store variables and implement logical decisions based on the values of the variables, to enable a user to play a game or games via DVD gaming system 20.

DVD player 24 may have a plurality of functions. For example, the DVD player may play the DVD game medium, may pause the playing of the DVD game medium, may stop the playing of the DVD game medium, may play the DVD game medium in a fast forward mode, may play the DVD game medium in a rewind mode, may provide a menu of the DVD game medium, may scroll up, down, left, and/or right in the DVD game medium, and/or may select an option provided in the DVD game medium. Additionally, or alternatively, the DVD player may be adapted to receive a plurality of different control signals from DVD game remote 26. In some embodiments, each control signal from the DVD game remote may be associated with a different function of the DVD player. Additionally, or alternatively, DVD player 24 may be adapted to perform an associated function in response to a received control signal from the DVD game remote.

In FIG. 3, DVD player 24 is shown schematically to include eight general parameter register memories (GPRMs) 30, each of which is configured to hold sixteen bits 32 of data. Therefore, DVD player 24 may include 128 bits of memory. Each bit 32 is typically capable of holding one of two possible values, conventionally represented as a zero or a one. GPRMs are typically provided to enable menu options and for controlling played content. Although DVD player 24 is shown to include memory storage in the form of eight GPRMs 30, many DVD players may include sixteen GPRMs and 24 system parameter register memories (SPRMs), each of which is configured to hold sixteen bits of data, for a total of 640 bits (or 80 bytes) of memory. Some DVD players include more memory, depending on the configuration and number of GPRMs, SPRMs, and/or other memory storage means. Thus, conventional DVD players, as the term is used in this disclosure, generally include less than 1 kilobyte (1,024 bytes or 8,192 bits) of onboard memory.

Thus, although the capacity of DVD players to store information may be extremely limited as compared with a traditional gaming console, such memory storage may be used to hold data corresponding to one or more game variables, which may be used to control game play. Specifically, GPRMs 30 of DVD player 24 may store game information. For example, if DVD game medium 22 includes a trivia game, the first six bits 32a-f of GPRM 30a may be used to hold data corresponding to a "Questions" variable, which may represent the number of questions asked during a particular game. If six bits 32 are allocated to the Questions variable, the variable may hold one of sixty-four ($2^6$) possible values, such as any number from 0 to 63.

Similarly, bit 32g of GPRM 30a may be used to store a "Multiplayer" variable or flag. If only one bit 32 is allocated to the Multiplayer flag, it may hold one of two ($2^1$) possible values. In this manner, it is possible to track whether the current game is a single player game represented, for example, by a held zero, or a multiplayer game, represented by a held one. As can be seen, each GPRM 30 may be segmented, such as by using bit shifting techniques, to hold more than one variable. Thus, other bits of GPRM 30a, as well as GPRMs 30b-h, may be used to hold other variables. Furthermore, it should be understood that some games may utilize more or fewer GPRMs 30, and/or other storage mechanisms, for holding values corresponding to game variables.

Because DVD gaming system 20 utilizes a DVD player, a user who has already purchased and set up such a DVD player may play games without having to purchase a separate gaming console or connect additional equipment to the user's television, which may not have the appropriate inputs for connecting such equipment. This feature of DVD gaming system 20 may be advantageous to game developers and retailers, because more individuals have access to DVD players than to proprietary game consoles. Thus, games played on a DVD player may appeal to a broader demographic, including individuals who may be unable to, or do not desire to, play games on proprietary gaming consoles.

In some embodiments, DVD player 24 may accept input from DVD game remote 26', which may include any suitable structure configured to allow players to selectively control DVD player 24. For example, as shown in FIG. 4, DVD game remote 26' may include a body 34, a detection subsystem 36, a signal processing subsystem (or processing subsystem) 38, and a communication subsystem 40. The body may include any suitable structure configured to at least partially support the detection subsystem, the signal processing subsystem, and/or the communication subsystem. Additionally, body 34 may include any suitable ornamentation and/or aesthetic features.

Detection subsystem 36 may include any suitable structure configured to detect one or more properties and/or characteristics of the body, such as one or more orientations and/or one or more movements of the body relative to any suitable reference plane(s). For example, detection subsystem 36 may include at least a first orientation sensor 42, which may be configured to detect a first orientation of the body relative to a reference plane and to generate a first orientation signal based on the detected first orientation.

The first orientation sensor may detect when the body has been tilted one or more directions away from a reference plane. For example, first orientation sensor 42 may detect when the body has been tilted away from a reference plane independent of the direction that the body is tilted away from that plane. Alternatively, the first orientation sensor may detect when the body has been tilted away from a reference plane only when the body is tilted away one or more particular directions.

In some embodiments, detection subsystem 36 may include a second orientation sensor 44, which may include any suitable structure configured to detect a second orientation of body 34 relative to a reference plane and to generate a second orientation signal based on the detected second orientation. The second orientation sensor may detect when the body has been tilted one or more directions away from a reference plane. For example, second orientation sensor 44 may detect when the body has been tilted away from a reference plane independent of the direction that the body is tilted away from that plane. Alternatively, the second orientation sensor may detect when the body has been tilted away from a reference plane only when the body is tilted away one or more particular directions.

Second orientation sensor 44 may supplement or complement first orientation sensor 42. For example, both first and second orientation sensors 42, 44 may be configured to detect when the body has been tilted away from a reference plane independent of the direction that the body is tilted away from that plane. In that example, the first and second orientation sensors may be referred to as supplementing each other because each sensor performs the same function and either or both may detect an orientation of body 34 relative to a reference plane and generate an orientation signal based on the detection orientation.

Alternatively, first orientation sensor 42 may be configured to detect when the body has been tilted away from a reference plane only when the body is tilted away in a first direction, while second orientation sensor 44 may be configured to detect when the body has been tilted away that reference plane only when the body is tilted away in a second direction. In that example, the first and second orientation sensors may be referred to as complementing each other because each sensor performs a different function of detecting either a first or a second orientation of the body relative to a reference plane and generating a first or second orientation signal based on the detected first or second orientation, where the second orientation is different from the first orientation.

The first and/or second orientation sensors may include any suitable structure configured to detect one or more orientations of the body relative to a reference plane. For example, the first and/or second orientation sensors may include one or more mercury tilt sensors and/or one or more micro-ball tilt sensors. Examples of those sensors as described in U.S. Patent Application Publication No. 2005/0143173, the complete disclosure of which has already been incorporated by reference for all purposes. Additionally, or alternatively, first and/or second orientation sensors 42, 44 may detect one or more orientations of the body relative to any suitable reference plane(s), such as vertical and/or horizontal reference planes.

Although detection subsystem 36 is shown to include first and second orientation sensors 42, 44, the detection subsystem may include any suitable number of orientation sensors. Additionally, although detection subsystem 36 is shown to include orientation sensors, the detection subsystem may additionally, or alternatively, include any suitable type(s) of sensors. For example, detection subsystem 36 may alternatively, or additionally, include one or more motion sensors configured to detect motion of body 34 and to generate one or more motion signals based on the detected motion. Additionally, or alternatively, detection subsystem 36 may include one or more acceleration sensors configured to detect acceleration of body 34 and to generate one or more acceleration signals based on the detected acceleration.

Moreover, although detection subsystem 36 is shown to detect one or more properties and/or characteristics of body 34, the detection subsystem may additionally, or alternatively, detect other properties and/or characteristics of one or more other components of DVD game remote 26'. For example, detection subsystem 36 may be configured to detect one or more movements of movable component(s) that are movably connected to the body (such as movements generated by the motion subsystem), and to generate one or more signals in response to the detected movements. Additionally, or alternatively, detection subsystem 36 may detect when one or more switches are activated, such as when one or more buttons are pressed.

Signal processing subsystem 38 may include any suitable structure configured to receive one or more signals from detection subsystem 36, such as one or more orientation signals, and to generate one or more corresponding control signals of a plurality of control signals for the DVD player based, at least in part, on the received signals. For example, the signal processing subsystem may be configured to receive at least a first orientation signal from first orientation sensor 42, and to generate a corresponding first one of a plurality of control signals for DVD player 24 based, at least in part, on the received first orientation signal. The first one of a plurality of control signals may be configured to command the DVD player to perform a first function.

Additionally, or alternatively, the signal processing subsystem may be configured to receive a second orientation signal from second orientation sensor 44, and to generate a corresponding second one of a plurality of control signals for DVD player 24 based, at least in part, on the received second orientation signal. The second one of a plurality of control signals may be configured to command the DVD player to perform a second function.

Signal processing subsystem 38 may include any suitable structure, such as a read-only memory (ROM) 46, a central processing unit (CPU) 48, and a random access memory (RAM) 50. ROM 46 may include any suitable structure configured to provide one or more predetermined operation programs for CPU 48. The ROM may store those programs in a non-volatile manner. The programs may include programs to receive one or more signals from detection subsystem 36 and/or to generate one or more corresponding control signals for the DVD player based, at least in part, on the received signals. CPU 48 may include any suitable structure configured to run the predetermined operation programs from ROM 46, while RAM 50 may include any suitable structure to store various data required for signal processing by CPU 48.

Signal processing subsystem 38 may include additional components configured to receive one or more signals from detection subsystem 36 and/or to generate one or more corresponding control signals for the DVD player based, at least in part, on the received signals. Those additional components may include a hard disk drive, floppy disk drive, CD-ROM drive, keyboard, interface wires/cables, and/or any suitable combination. The control signals generated by signal processing subsystem 38 may include signals readable by a conventional DVD player, such as "Up," "Down," "Enter," and "Menu" signals, to cause a specific response by the DVD player and/or to command the DVD player to perform a particular function. Additionally, or alternatively, the control signals may include specific chapters or time codes corresponding to specific chapters in the DVD game medium.

Communication subsystem 40 may include any suitable structure configured to transmit one or more control signals from signal processing subsystem 38 to DVD player 24. For example, the communication subsystem may include a light-emitting diode (LED) 52. Communication subsystem 40 may include additional components configured to allow the communication subsystem to transmit control signals from signal processing subsystem 38 to DVD player 24. For example, to facilitate the use of DVD game remote 26' with a variety of different DVD players, communication subsystem 40 also may include universal remote control circuitry, which allows LED 52 to be programmed to communicate with a particular DVD player, such as DVD player 24.

If configured with universal remote control circuitry, LED 52 may be programmed by entering a code corresponding to a particular DVD player. In some embodiments, the DVD game remote may be programmed by directing a signal from another DVD remote that is associated with the DVD player to a remote signal receiver 54 of the DVD game remote. The remote signal receiver may be configured to receive one or more remote signals from another DVD remote that is associated with DVD player 24 and signal processing subsystem 38 may be configured to receive the one or more remote signals from the remote signal receiver and to modify the control signals generated by the signal processing subsystem based at least in part, on the received remote signal(s), such that DVD player 24 may recognize the control signal(s) from the DVD game remote.

LED 52 may additionally, or alternatively, be programmed by running an automatic detection query in which DVD game remote 26' transmits different signals until a signal corresponding to a particular DVD player is found. Although the communication subsystem is shown to include an LED for communicating signals, any suitable structure may be used, such as other optical communication mechanisms, radio communication mechanisms, or any other suitable mode configured to send one or more signals to a DVD player. Additionally, although DVD game remote 26' is shown to include detection subsystem 36, signal processing subsystem 38, and communication subsystem 40, the DVD game remote may additionally, or alternatively, include one or more other subsystems configured to allow the DVD game remote to selectively control DVD player 24. For example, DVD game remote 26' may include a power subsystem (such as a battery assembly) configured to provide power to one or more of the other subsystems.

In some embodiments, the body may include one or more movable components 56 that may be movably connected the body in any suitable way(s), such as pivotally connected, rotatably connected, and/or slidingly connected. Additionally, the DVD game remote may further include a motion subsystem 56, which may include any suitable structure configured to produce or generate movement in movable components 58 and/or to generate one or more movement signals. For example, motion subsystem 56 may include at least one motion generating mechanism 60. Motion generating mechanism 60 may include any suitable structure configured to move one or more of components 58. For example, the motion generating mechanism may include motors, gear assemblies, lever assemblies, trigger assemblies, etc.

In some embodiments, motion subsystem 56 may be configured to generate one or more movement signals responsive to one or more movements of components 58 and/or activation of one or more trigger assemblies. Those movement signals may be received by signal processing subsystem 38, which may then generate one or more corresponding control signals for the DVD player based, at least in part, on the one or more movement signals. Although DVD game remote 26' is shown to include specific subsystems and specific components within those subsystems, any suitable combination of subsystems and/or components within the subsystems may be used configured to allow players to selectively control DVD player 24.

Figure 5:
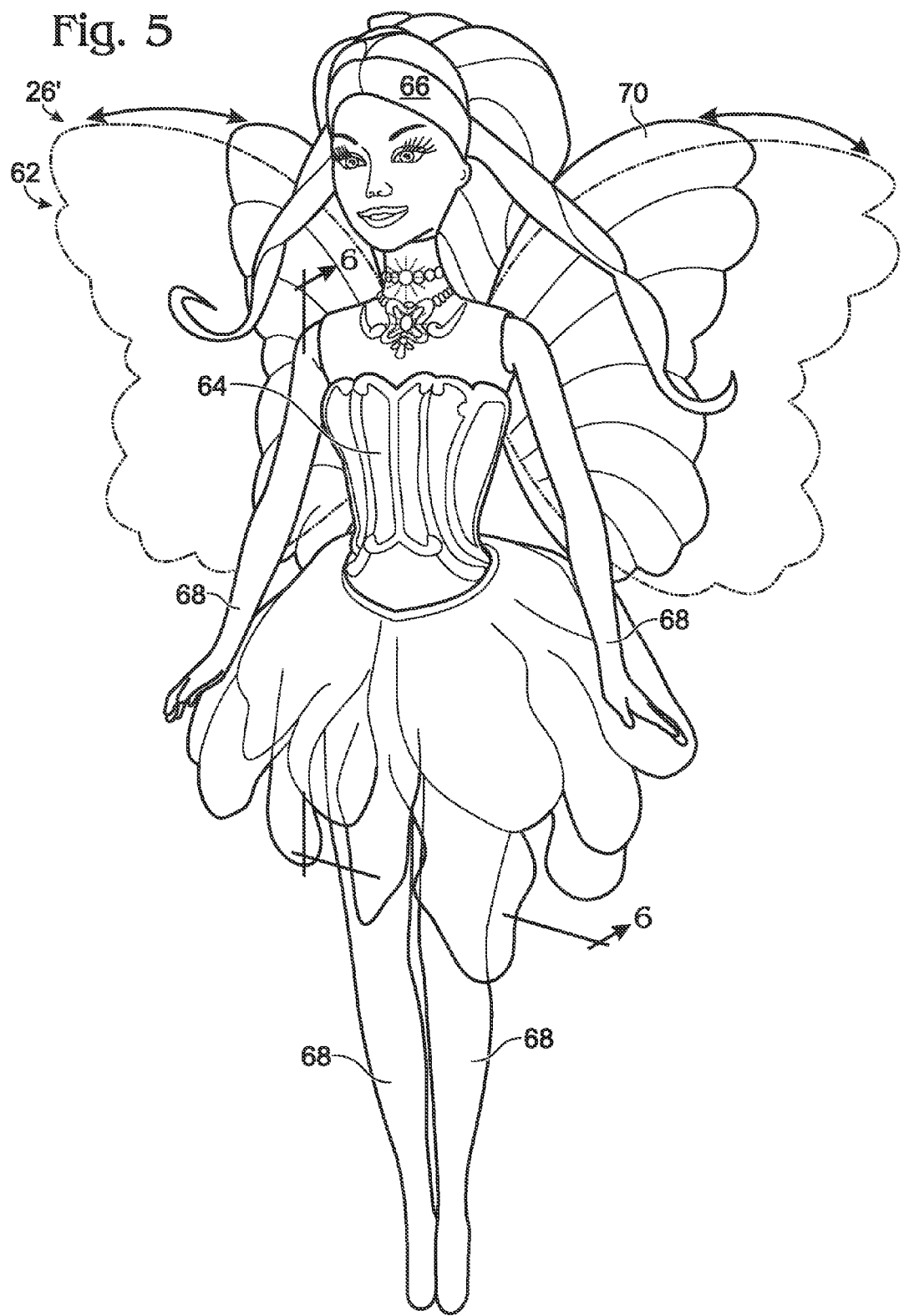
FIG. 5 is an isometric view of an example of the DVD game remote of FIG. 4.

FIG. 5 shows an example of DVD game remote 26' in the form of a toy FIG. 62 configured to selectively control DVD player 24. Unless otherwise specified, toy FIG. 62 may include one or more components and/or one or more functions associated with DVD game remote 26' discussed above. The toy figure may include a body 64, a head 66, one or more appendages 68, a pair of wings 70, and one or more buttons 71. The head, one or more appendages, and/or the wings may be movably connected to the body.

Although the toy figure is shown to include four appendages and a pair of wings, the toy figure may include any suitable number of appendages and/or any suitable number of wings. In some embodiments, the toy figure may not include wings. Additionally, although a particular toy figure is shown, DVD game remote 26' may resemble any suitable toy figure, stuffed animal, book, wand, writing instrument, etc.

Figure 6:
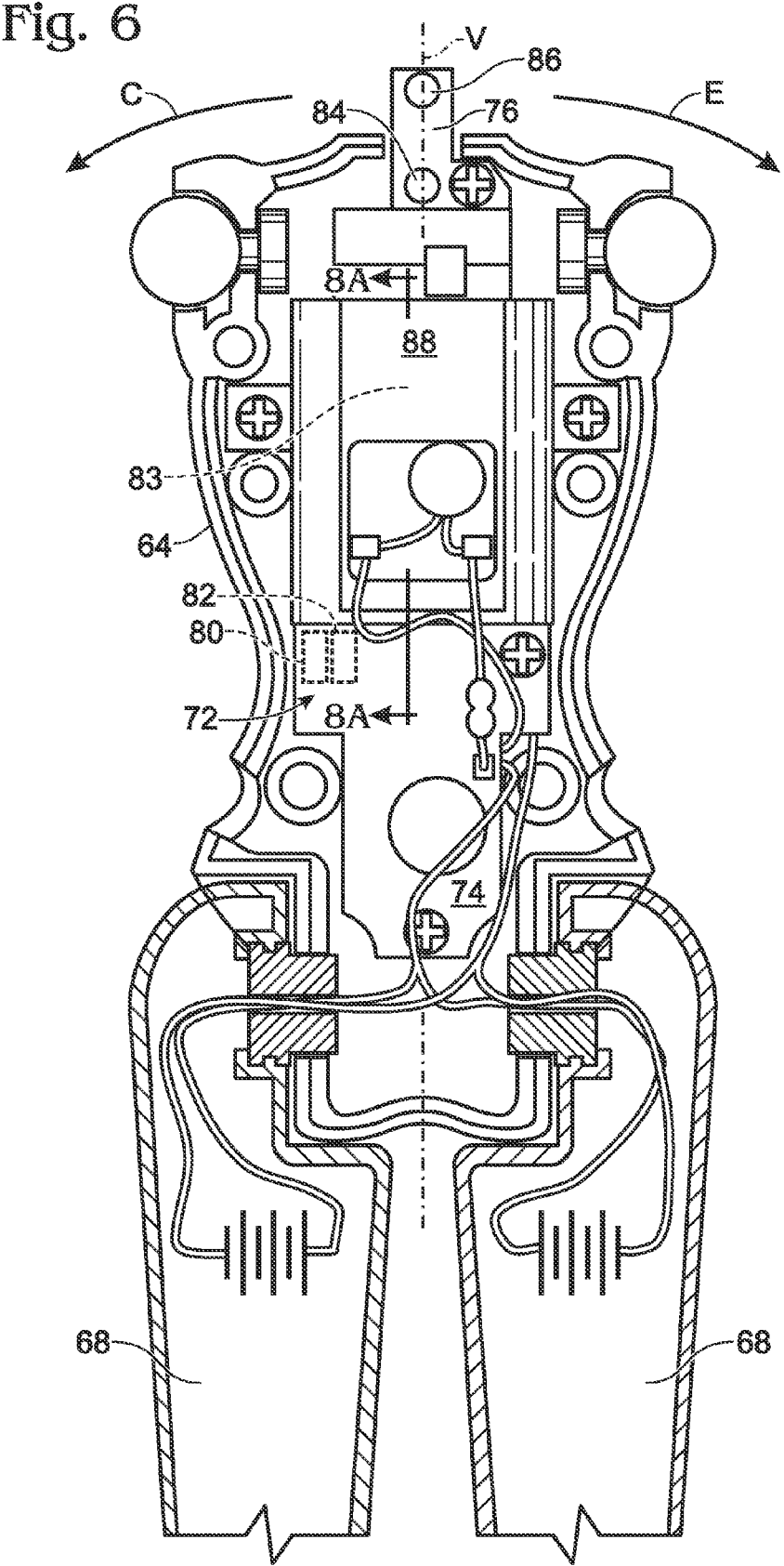
FIG. 6 is a sectional view of the DVD game remote of FIG. 4 taken along lines 6-6 in FIG. 5.

Body 64 may support a detection subsystem 72, a signal processing subsystem 74, a communication subsystem 76, and a motion subsystem 78, as shown in FIG. 6. The detection subsystem may include a first orientation sensor 80, a second orientation sensor 82, and one or more button sensors 83. The first orientation sensor may be configured to detect when body 64 is tilted or rotated in a clockwise (or right) direction C relative to a vertical reference plane V, and to generate a first orientation signal based on that detected orientation.

Second orientation sensor 82 may be configured to detect when body 64 is tilted or rotated in a counter-clockwise (or left) direction E relative to the vertical reference plane, and to generate a second orientation signal based on that detection orientation. The orientation sensors may include any suitable structure, including the structure discussed above. Although two orientation sensors are shown, the detection subsystem may include any suitable number of sensors and/or any suitable type(s) of sensors.

Button sensors 83 may be configured to detect when one or more of buttons 71 is pressed, and to generate one or more button signals based on that detected activation of the button (s). Although buttons 71 and button sensors 83 are shown, the toy figure may alternatively, or additionally, include one or more other types of switches, such as pull cords, knobs, cables, levers, etc.

Signal processing subsystem 74 may be configured to receive one or more signals from other components of the toy figure, such as one or more orientation signals from the orientation sensors, one or more button signals from the button sensors, one or more movement signals from the motion subsystem, and/or one or more remote signals from the communication subsystem. Additionally, the signal processing subsystem may be configured to generate one or more control signals from a plurality of control signals based, at least in part, on the received signals. Those control signals may command the DVD player to perform one or more functions.

For example, signal processing subsystem 74 may be configured to receive at least an orientation signal, and to generate one or more control signals from a plurality of control signals based, at least in part, on the received orientation signal. Additionally, or alternatively, the signal processing subsystem may be configured to receive one or more movement signals, and to generate one or more control signals from a plurality of control signals based, at least in part, on the received movement signal. Alternatively, or additionally, signal processing subsystem 74 may be configured to receive one or more remote signals, and to modify one or more control signals based, at least in part, on the received one or more remote signals.

Communication subsystem 76 may include an LED 84 and a remote signal receiver 86. The LED may be configured to transmit the one or more control signals from signal processing subsystem 38 toward DVD player 24, while the remote signal receiver may be configured to receive one or more signals from a DVD remote associated with the DVD player. Although communication subsystem 76 is shown to include LED 84, the communication subsystem may include optical communication mechanisms, radio communication mechanisms, and/or any other suitable mode configured to send one or more control signals to DVD player 24.

Figure 7:
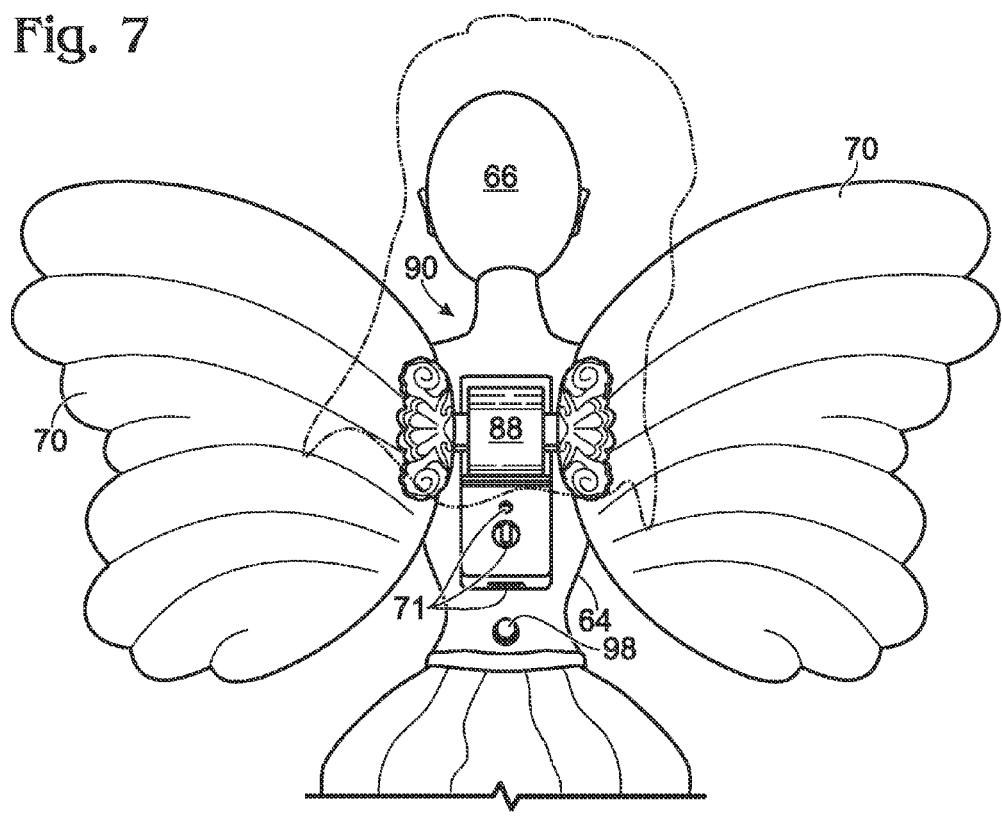
FIG. 7 is partial rear view of the DVD game remote of FIG. 4.
Figure 8A:
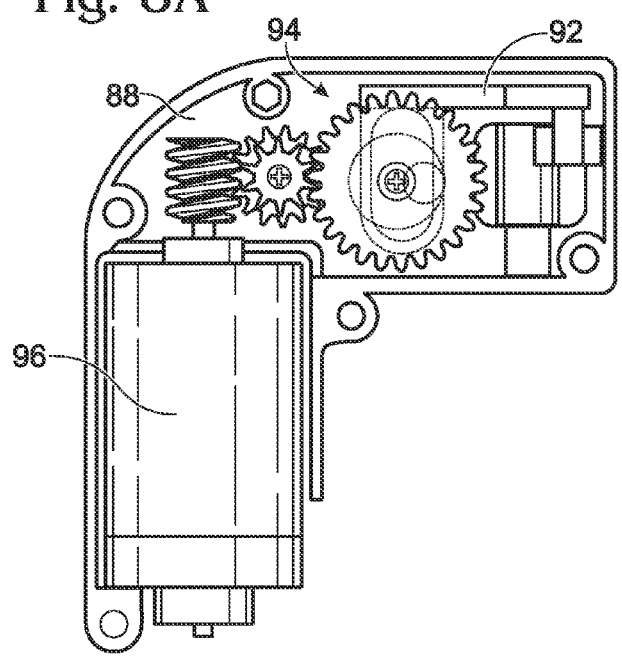
FIG. 8A is a partial sectional view of a wing movement mechanism of the DVD game remote of FIG. 4 taken along lines 8A-8A in FIG. 7.

Motion subsystem 78 may include any suitable structure configured to generate movement. For example, motion subsystem 78 may include a wing movement mechanism 88, which may include any suitable structure configured to selectively move pair of wings 70, a shown in FIG. 7. In some embodiments, wings 70 and wing movement mechanism 88 may be referred to as wing assembly 90. The wing movement mechanism may include cam followers 92, a gear assembly 94, and a motor 96, and a trigger 98, as shown in FIGS. 7-8.

Figure 8B:
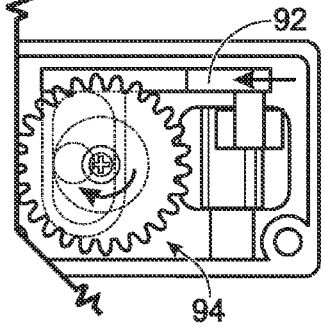
FIG. 8B is a partial view of the wing movement mechanism of FIG. 8A showing movement of a gear assembly and a cam follower.

Cam followers 92 and/or gear assembly 94 may operatively connect motor 96 with wings 70. Motor 96 may generate rotational movement in gear assembly 94, which may be converted to sliding movement in cam followers 92, as shown in FIG. 8B. That sliding movement may move wings 70 to provide a fluttering appearance, as shown in FIG. 5. Trigger 98 may selectively activate motor 96 to allow a user to flutter the wings of the toy figure when desired.

Although wing movement mechanism 88 is shown to include particular cam followers and a particular gear assembly, the wing movement mechanism may include any suitable structure configured to selectively move one or more of the wings. Additionally, although trigger 98 is shown to activate motor 96 to move wings 70, one or more other components of the toy figure may trigger the motor, such as one or more of the orientation sensors. For example, first and/or second orientation sensors may activate the motor when tilting of the body relative to a reference plane is detected.

In some embodiments, wing movement mechanism 88 may be configured to generate a wing movement signal responsive to activation of trigger 98. In those embodiments, signal processing subsystem 74 may be configured to receive the wing movement signal and to generate one or more control signals of a plurality of control signals for the DVD player based, at least in part, on the wing movement signal. Those control signals may be configured to command the DVD player to perform one or more functions.

Although motion subsystem 78 is shown to include a wing movement mechanism 88, the motion subsystem may alternatively, or additionally, include one or more other movement mechanisms configured to move one or more other movable components of the toy figure. For example, the motion subsystem may include a head movement mechanism configured to selectively move the head and/or an appendage movement mechanism configured to selectively move one or more appendages. Those mechanisms may include externally accessible triggers, such as trigger 98, and/or may be triggered by one or more other components, such as the orientation sensor(s).

Various games may be played with DVD gaming system 20 having DVD game remote 26, such as DVD game remote 26', and DVD game medium 22. For example, games may be played in which the displayed image corresponds to a game character with an appearance similar to an appearance of toy FIG. 62. In those games, the DVD player may be configured to receive control signals and to play DVD game medium 22 to produce an image on display device 28 that moves in a first direction in response to a first control signal, and/or a second direction (which may be different from the first direction) in response to a second control signal. For example, tilting the toy figure in the clockwise direction may cause the toy figure to send a first control signal to the DVD player to move the displayed game character in the right direction, and/or tilting the toy figure in the counter-clockwise direction may cause the toy figure to send a second control signal to move the displayed game character in the left direction. Additionally, or alternatively, the DVD player may be configured to play the DVD game medium to produce an image on display device 28 with wings that move in response to a third control signal. For example, activating the wings using trigger 98 may cause the toy figure to send a third control signal to move the wings of the displayed game character.

Although the toy figure is discussed to control whether a displayed game character goes left or right or flutters its wings, the toy figure may additionally, or alternatively, be used to control a displayed game character to go in any suitable direction, such as up and/or down, and/or to perform any suitable action(s), such as picking-up items, punching, kicking, etc. For example, the toy figure may include appendage movement sensors to detect when the appendages of the toy figure are moved. Those sensors may generate one or more appendage movement signals that are received by the signal processing subsystem. The signal processing subsystem may then generate one or more control signals that may cause the displayed game character to punch and/or kick.

Although gaming systems and features of gaming systems have been shown and described with reference to the foregoing operational principles and preferred embodiments, those skilled in the art will find apparent that various changes in form and detail may be made without departing from the spirit and scope of the claims. The present disclosure is intended to embrace all such alternatives, modifications, and variances that fall within the scope of the appended claims.

What is claimed is:

1. A toy figure configured to selectively control a DVD player having a DVD game medium, the DVD player having a plurality of different functions and being adapted to receive a plurality of different control signals with each control signal being associated with a different function of the DVD player, and to perform the associated function in response to a received control signal, the toy figure comprising:
    a body;
    at least a pair of wings attached to the body and configured to be moved relative to the body;
    a motion subsystem configured to generate movement of at least one of the one or more parts, the motion subsystem including a motor, a gear assembly operatively connecting the motor and the at least a pair of wings, and a trigger configured to activate the motor to move the at least a pair of wings, the motion subsystem being further configured to generate a movement signal responsive to activation of the trigger;
    at least a first orientation sensor supported by the body and configured to detect a first orientation of the body relative to a reference plane, and to generate a first orientation signal based on the detected first orientation; and
    a processing subsystem supported by the body and configured to receive at least the first orientation signal, and to generate a corresponding first control signal the plurality of different control signals based, at least in part, on the received first orientation signal, the processing subsystem further configured to receive the movement signal, and to generate a corresponding second control signal of the plurality of different control signals based, at least in part, on the received movement signal to selectively control the DVD player having the DVD game medium.

2. The toy figure of claim 1, further comprising a second orientation sensor supported by the body and configured to detect a second orientation of the body relative to the reference plane, and to generate a second orientation signal based on the detected second orientation, wherein the second orientation is different from the first orientation, and wherein the processing subsystem is further configured to receive the second orientation signal and to generate a corresponding third control signal of the plurality of different control signals based, at least in part, on the received second orientation signal.

3. The toy figure of claim 1, wherein the DVD game medium includes a plurality of chapters, and wherein at least the first one of the plurality of control signals is configured to command the DVD player to select at least one chapter of the plurality of chapters.

4. The toy figure of claim 1, wherein the reference plane is a vertical reference plane.

5. A DVD gaming kit for playing a game using a display device and a DVD player that is configured to receive control signals and to play a DVD game medium to produce an image on the display device that moves in a first direction in response to a first control signal, the image including wings that move in response to a second control signal, the DVD gaming kit comprising:
- a DVD game medium for playing a game having a displayed image corresponding to a game character; and
- a toy figure having an appearance corresponding to the game character, the toy figure including:
  - a body;
  - a wing assembly attached to the body, the wing assembly including at least a pair of wings and a wing movement mechanism configured to generate movement of the at least a pair of wings, the wing movement mechanism including a motor, a gear assembly operatively connecting the motor and the at least a pair of wings, and a trigger configured to activate the motor to generate movement of the at least a pair of wings, the wing assembly being configured to generate a wing movement signal responsive to activation of the trigger;
  - at least a first orientation sensor supported by the body and configured to detect a first orientation of the body relative to a reference plane, and to generate a first orientation signal based on the detected first orientation; and
  - a processing subsystem supported by the body and configured to receive at least the first orientation signal and to generate the first control signal based, at least in part, on the received first orientation signal, the processing subsystem being further configured to receive the wing movement signal and to generate the second control signal based, at least in part, on the received wing movement signal to provide control signals to the DVD player for playing the DVD game.

6. The DVD gaming kit of claim 5, wherein the DVD player is further configured to play a DVD game medium to produce an image on the display device that moves in a second direction in response to a third control signal, the second direction being different from the first direction, wherein the toy figure further includes a second orientation sensor supported by the body and configured to detect a second orientation of the body relative to the reference plane, and to generate a second orientation signal based on the detected second orientation, wherein the second orientation is different from the first orientation, and wherein the processing subsystem is further configured to receive the second orientation signal and to generate the third control signal based, at least in part, on the received second orientation signal.

7. The DVD gaming kit of claim 5, wherein the DVD game medium includes a plurality of chapters, and wherein the first control signal is configured to command the DVD player to select at least one chapter of the plurality of chapters.

8. The DVD gaming kit of claim 5, wherein the toy figure further includes a remote signal receiver supported by the body and configured to receive one or more remote signals from a DVD remote associated with the DVD player, wherein the processing subsystem is further configured to receive the one or more remote signals from the remote signal receiver and to modify at least the first control signal based, at least in part, on the received one or more remote signals.

9. The DVD gaming kit of claim 5, wherein the reference plane is a vertical reference plane.

10. A toy figure configured to selectively control a DVD player having a DVD game medium, comprising:
- a body;
- a head movably connected to the body;
- one or more appendages movably connected to the body;
- a wing assembly attached to the body, the wing assembly including at least a pair of wings and a wing movement mechanism configured to generate movement of the at least a pair of wings, the wing movement mechanism including a motor, a gear assembly operatively connecting the motor and the at least a pair of wings, and a trigger configured to activate the motor to move the at least a pair of wings, the wing assembly being configured to generate a wing movement signal responsive to activation of the trigger;
- at least a first orientation sensor supported by the body and configured to detect a first orientation of the body relative to a reference plane, and to generate a first orientation signal based on the detected first orientation; and
- a processing subsystem supported by the body and configured to receive at least the first orientation signal, and to generate a first control signal based, at least in part, on the received first orientation signal, wherein the first control signal is configured to command the DVD player to perform a first function, the processing subsystem being further configured to receive the wing movement signal and to generate a second control signal based, at least in part, on the wing movement signal, wherein the second control signal is configured to command the DVD player to perform a second function.

11. The toy figure of claim 10, further comprising a second orientation sensor supported by the body and configured to detect a second orientation of the body relative to a reference plane, and to generate a second orientation signal based on the detected second orientation, wherein the processing subsystem is further configured to receive the second orientation signal and to generate a third control signal based, at least in part, on the received second orientation signal, and wherein the third control signal is configured to command the DVD player to perform a third function.

12. The toy figure of claim 10, wherein the DVD game medium includes a plurality of chapters, and wherein at least the first control signal is configured to command the DVD player to select at least one chapter of the plurality of chapters.

* * * * *